США011690145B2

United States Patent
Wild

(10) Patent No.: US 11,690,145 B2
(45) Date of Patent: *Jun. 27, 2023

(54) METHOD FOR OPERATING A COMMERCIAL COOKING DEVICE AND SUCH A COOKING DEVICE

(71) Applicant: Convotherm-Elektrogeräte GmbH, Eglfing (DE)

(72) Inventor: Hannes Wild, Riegsee (DE)

(73) Assignee: CONVOTHERM-ELEKTROGERATE GMBH, Eglfing (DE)

( * ) Notice: Subject to any disclaimer, the term of this patent is extended or adjusted under 35 U.S.C. 154(b) by 220 days.

This patent is subject to a terminal disclaimer.

(21) Appl. No.: 15/780,908

(22) PCT Filed: Dec. 7, 2016

(86) PCT No.: PCT/EP2016/080048
§ 371 (c)(1),
(2) Date: Jun. 1, 2018

(87) PCT Pub. No.: WO2017/102494
PCT Pub. Date: Jun. 22, 2017

(65) Prior Publication Data
US 2019/0008004 A1    Jan. 3, 2019

(30) Foreign Application Priority Data
Dec. 17, 2015    (DE) .......................... 102015225581.6

(51) Int. Cl.
*H05B 6/64* (2006.01)
*A21B 3/04* (2006.01)
(Continued)

(52) U.S. Cl.
CPC .............. *H05B 6/642* (2013.01); *A21B 3/04* (2013.01); *A23L 5/13* (2016.08); *A47J 27/16* (2013.01);
(Continued)

(58) Field of Classification Search
CPC .. F24C 7/08; F24C 15/006; A21B 3/04; A47J 27/16; A23L 5/13; H05B 6/642; A23V 2002/00
(Continued)

(56) References Cited

U.S. PATENT DOCUMENTS 3,289,742 A * 12/1966 Johann ...................... F28B 1/06
165/111
3,399,833 A * 9/1968 Johnson ................... F23C 3/002
237/53
(Continued)

FOREIGN PATENT DOCUMENTS

DE        2921995 A1    12/1979
DE        10236961 A1    2/2004
(Continued)

OTHER PUBLICATIONS

International Search Report dated Feb. 1, 2017 for PCT application No. PCT/EP2016/080048.

*Primary Examiner* — Eric S Stapleton
(74) *Attorney, Agent, or Firm* — Ohlandt, Greeley, Ruggiero and Perle, LLP

(57) ABSTRACT

A method for operating the cooking device, especially a commercial cooking device cooking device with different operating modes, which has a least one heating device, a main cooling fan, at least one electrical component in a first space directly acted upon by the main cooling fan, at least one other electrical component which is to be cooled in a second space not directly acted upon by the main cooling
(Continued)

fan, wherein the method has the following method steps: determining and setting limit temperatures which are assigned to the operating modes with cooling being initiated when these are exceeded, determining the activated operating mode, determining whether in the first space a temperature that is dependent on the activated operating mode exceeds the limit temperature assigned to the activated operating mode, and activating the main cooling fan if it is determined that the temperature is above the limit temperature or limit temperatures, wherein part of the aspirated air flow is conducted directly into the second space.

13 Claims, 6 Drawing Sheets

(51) Int. Cl.
| A23L 5/10 | (2016.01) |
| A47J 27/16 | (2006.01) |
| F24C 15/00 | (2006.01) |
| F24C 7/08 | (2006.01) |

(52) U.S. Cl.
CPC .............. F24C 7/08 (2013.01); F24C 15/006 (2013.01); *A23V 2002/00* (2013.01)

(58) Field of Classification Search
USPC .......................................................... 219/391
See application file for complete search history.

(56) References Cited

U.S. PATENT DOCUMENTS

| | | | | | |
|---|---|---|---|---|---|
| 3,469,567 | A * | 9/1969 | Bergquist | ................ | F24C 3/128 126/39 R |
| 3,514,965 | A * | 6/1970 | Brown | ................... | F25B 15/04 62/148 |
| 3,797,473 | A * | 3/1974 | Mutchler | .............. | F24C 15/322 126/21 A |
| 3,984,578 | A * | 10/1976 | Rohrl | ........................ | F24C 7/08 426/523 |
| 4,055,297 | A * | 10/1977 | Lee | ........................ | F24B 1/187 236/11 |
| 4,071,739 | A * | 1/1978 | Jenn | ....................... | F24C 15/325 219/400 |
| 4,201,924 | A * | 5/1980 | Uram | .................... | F01K 23/108 290/40 R |
| 4,243,176 | A * | 1/1981 | Hays | ........................ | F23D 14/60 237/7 |
| 4,297,987 | A * | 11/1981 | Bushee | .................. | F24H 1/403 122/235.11 |
| 4,308,853 | A * | 1/1982 | Thirode | ................ | F24C 15/325 126/21 A |
| 4,314,126 | A * | 2/1982 | Yoshimura | ........... | H05B 6/6482 219/685 |
| 4,337,893 | A * | 7/1982 | Flanders | ............ | G05D 23/1917 237/7 |
| 4,340,355 | A * | 7/1982 | Nelson | .................... | F23N 5/025 431/20 |
| 4,369,030 | A * | 1/1983 | Siccardi | ................ | F24H 3/0488 432/37 |
| 4,375,950 | A * | 3/1983 | Durley, III | ............. | F23N 1/022 431/12 |
| 4,418,615 | A * | 12/1983 | Higgins | .................... | F24C 1/04 126/21 A |
| 4,457,291 | A * | 7/1984 | Henke | .................... | F23N 1/025 126/21 A |
| 4,480,629 | A * | 11/1984 | Williams | .............. | F24H 3/0488 126/99 R |
| 4,503,760 | A * | 3/1985 | Pryputsch | ............. | F24C 15/322 99/447 |
| 4,558,523 | A * | 12/1985 | Isbell | ........................ | A23B 5/02 34/491 |
| 4,623,781 | A * | 11/1986 | Thomas | .................. | F24C 14/02 126/273 R |
| 4,671,250 | A * | 6/1987 | Hurley | .................. | F24C 15/322 126/21 A |
| 4,846,148 | A * | 7/1989 | Zifferer | .................... | F24H 1/107 126/355.1 |
| 4,907,737 | A * | 3/1990 | Williams, Jr. | .......... | F23N 5/203 236/11 |
| 4,922,861 | A * | 5/1990 | Tsutsui | .................... | F23N 1/082 122/448.1 |
| 4,951,645 | A * | 8/1990 | Luebke | .................. | A21B 1/245 126/19 R |
| 4,963,375 | A * | 10/1990 | Sato | ......................... | A21B 1/40 426/231 |
| 4,964,392 | A * | 10/1990 | Bruno | ...................... | A21B 1/48 126/21 A |
| 4,976,459 | A * | 12/1990 | Lynch | ..................... | F23N 1/022 236/11 |
| 4,982,721 | A * | 1/1991 | Lynch | ...................... | F23N 1/022 126/116 A |
| 5,014,679 | A * | 5/1991 | Childs | ..................... | A47J 27/04 126/21 A |
| 5,027,789 | A * | 7/1991 | Lynch | ...................... | F23N 1/022 126/116 A |
| 5,032,154 | A * | 7/1991 | Wright | ................... | B03C 3/013 422/109 |
| 5,045,658 | A * | 9/1991 | Smith | ..................... | G05D 23/24 219/516 |
| 5,147,994 | A * | 9/1992 | Smith | ..................... | A21B 1/245 219/679 |
| 5,165,328 | A * | 11/1992 | Erickson | ................ | A47J 37/015 126/21 A |
| 5,186,386 | A * | 2/1993 | Lynch | ..................... | F23N 5/203 236/11 |
| 5,197,664 | A * | 3/1993 | Lynch | ..................... | F23N 5/242 236/11 |
| 5,257,574 | A * | 11/1993 | Hiromichi | .............. | A23N 12/12 99/483 |
| 5,382,775 | A * | 1/1995 | Lee | ........................ | H05B 6/6411 219/702 |
| 5,485,780 | A * | 1/1996 | Koether | ................ | F24C 15/006 219/400 |
| 5,630,408 | A * | 5/1997 | Versluis | .................. | F23N 1/027 122/14.21 |
| 5,676,044 | A * | 10/1997 | Lara, Jr. | ................. | A21B 1/245 126/21 A |
| 5,676,870 | A * | 10/1997 | Wassman | .............. | F24C 15/325 126/21 A |
| 5,678,493 | A * | 10/1997 | Kelley | .................. | B01D 53/323 110/185 |
| 5,771,879 | A * | 6/1998 | Saltzman | .................. | F24C 15/20 126/299 D |
| 5,975,072 | A * | 11/1999 | Garceau | .................. | F23N 5/20 126/39 G |
| 6,059,195 | A * | 5/2000 | Adams | .................. | F24H 9/2035 236/20 R |
| 6,097,000 | A * | 8/2000 | Frasnetti | ................ | F24C 15/006 219/395 |
| 6,109,339 | A * | 8/2000 | Talbert | ..................... | F24H 1/43 165/48.1 |
| 6,262,406 | B1 * | 7/2001 | McKee | .................. | F24C 15/322 219/681 |
| 6,369,360 | B1 * | 4/2002 | Cook | ......................... | A21B 1/26 219/388 |
| 6,447,827 | B1 * | 9/2002 | Andersen | .................. | A23B 4/07 426/231 |
| 6,555,791 | B2 * | 4/2003 | Lubrina | .................... | A21B 3/04 126/21 A |
| 6,557,774 | B1 * | 5/2003 | Krueger | .................... | F24D 3/02 237/66 |
| 6,624,396 | B2 * | 9/2003 | Witt | .......................... | A21B 1/42 219/388 |
| 6,630,650 | B2 * | 10/2003 | Bassill | .................... | H05B 6/062 219/626 |
| 6,723,961 | B2 * | 4/2004 | Choat | .................... | H05B 6/6476 126/21 A |

(56) References Cited

U.S. PATENT DOCUMENTS

| | | | | |
|---|---|---|---|---|
| 6,932,862 B2* | 8/2005 | Daugherty | | C09D 5/18 106/287.14 |
| 7,012,219 B2* | 3/2006 | Kim | | F24C 15/325 126/21 A |
| 7,060,941 B1* | 6/2006 | Embury | | F24C 7/08 219/401 |
| 7,081,226 B1* | 7/2006 | Wittwer | | B01L 3/5025 422/50 |
| 7,282,672 B2* | 10/2007 | Wurm | | F24C 14/00 126/21 A |
| 7,282,673 B2* | 10/2007 | Sung | | F24C 15/325 219/400 |
| 7,297,904 B2* | 11/2007 | Paller | | A21B 1/26 126/21 A |
| 7,309,846 B2* | 12/2007 | Haberkamm | | F24C 7/08 126/21 A |
| 7,372,000 B2* | 5/2008 | Stockley | | F24C 15/16 126/21 A |
| 8,006,685 B2* | 8/2011 | Bolton | | A47J 37/0641 126/21 A |
| 8,075,304 B2* | 12/2011 | Cox | | F23N 1/045 431/90 |
| 8,258,435 B2* | 9/2012 | Bonuso | | F24C 15/325 219/400 |
| 8,350,192 B2* | 1/2013 | Phillips | | F24C 15/325 219/400 |
| 8,378,265 B2* | 2/2013 | Greenwood | | F24C 15/327 219/391 |
| 8,461,488 B2* | 6/2013 | Jeong | | F24C 15/325 219/400 |
| 8,525,080 B2* | 9/2013 | Ruther | | F24C 15/325 219/400 |
| 8,735,778 B2* | 5/2014 | Greenwood | | A21D 8/06 219/400 |
| 8,839,714 B2* | 9/2014 | Schjerven, Sr. | | A47J 37/045 99/476 |
| 8,839,779 B2* | 9/2014 | Wiker | | A21B 1/48 126/19 R |
| 8,946,604 B2* | 2/2015 | Kaiser | | F24C 15/327 219/681 |
| 8,950,319 B2* | 2/2015 | Nam | | H05B 6/6476 99/476 |
| 9,585,400 B2* | 3/2017 | Wiker | | A21B 3/04 |
| 9,759,483 B1* | 9/2017 | Bero | | F26B 3/0926 |
| 10,024,548 B2* | 7/2018 | Wiker | | F24C 14/00 |
| 2002/0029695 A1* | 3/2002 | Gongwer | | A47J 37/0745 99/386 |
| 2002/0153371 A1* | 10/2002 | Oshima | | H05K 7/20154 219/757 |
| 2003/0179653 A1* | 9/2003 | McLemore | | A47J 36/32 368/10 |
| 2003/0213371 A1* | 11/2003 | Saunders | | A47J 37/0857 99/327 |
| 2004/0035845 A1* | 2/2004 | Moon | | A47J 37/0623 219/400 |
| 2004/0040950 A1* | 3/2004 | Carbone | | F24C 15/325 219/400 |
| 2004/0079355 A1* | 4/2004 | Divert | | F24C 15/006 126/21 R |
| 2004/0227003 A1* | 11/2004 | Alvarez | | F24H 6/00 237/8 R |
| 2005/0064582 A1* | 3/2005 | Wittwer | | C12Q 1/686 435/287.2 |
| 2005/0235984 A1* | 10/2005 | Trihey | | F24D 17/0068 126/615 |
| 2006/0251784 A1* | 11/2006 | Sells | | A23L 5/13 426/510 |
| 2006/0251785 A1* | 11/2006 | Fraccon | | A21B 1/14 426/510 |
| 2006/0289438 A1* | 12/2006 | Fraccon | | F24C 15/327 219/401 |
| 2007/0006865 A1* | 1/2007 | Wiker | | F24C 3/122 126/21 A |
| 2007/0012307 A1* | 1/2007 | Wiker | | A21B 1/40 126/21 A |
| 2007/0104844 A1* | 5/2007 | Fraccon | | F24C 15/327 426/496 |
| 2007/0137633 A1* | 6/2007 | McFadden | | H05B 6/60 126/21 A |
| 2008/0083404 A1* | 4/2008 | Rappold | | F24H 3/087 126/524 |
| 2008/0124668 A1* | 5/2008 | Schultz | | F23N 1/027 431/89 |
| 2008/0236404 A1* | 10/2008 | Ose | | F24C 7/08 99/327 |
| 2008/0277488 A1* | 11/2008 | Cockerill | | F24F 11/62 236/46 R |
| 2009/0104329 A1* | 4/2009 | Bally | | F24C 15/027 426/523 |
| 2009/0107479 A1* | 4/2009 | Armstrong | | F24C 15/006 126/21 A |
| 2009/0136640 A1* | 5/2009 | Embury | | A23L 5/13 426/510 |
| 2010/0051245 A1* | 3/2010 | Wiseman | | F24C 15/006 165/104.34 |
| 2010/0195991 A1* | 8/2010 | Deivasigamani | | G05D 23/1927 392/308 |
| 2010/0282440 A1* | 11/2010 | Trihey | | F24D 3/08 165/104.19 |
| 2010/0282732 A1* | 11/2010 | Fich Pedersen | | F24C 7/08 219/412 |
| 2011/0048245 A1* | 3/2011 | Schjerven, Sr. | | A21B 1/245 99/331 |
| 2011/0136025 A1* | 6/2011 | Tatsui | | H01M 8/0612 429/412 |
| 2011/0223099 A1* | 9/2011 | Nakamura | | H01M 8/0618 423/648.1 |
| 2011/0269085 A1* | 11/2011 | Wiker | | A21B 1/48 432/4 |
| 2012/0118169 A1* | 5/2012 | Hirano | | F24C 15/006 99/325 |
| 2012/0152937 A1* | 6/2012 | Nordh | | H05B 6/642 219/702 |
| 2012/0180775 A1* | 7/2012 | Waltz | | A21B 1/245 126/15 R |
| 2013/0025364 A1* | 1/2013 | Bach | | G01F 1/688 73/204.23 |
| 2013/0035030 A1* | 2/2013 | Bach | | G01F 1/34 454/256 |
| 2013/0312645 A1* | 11/2013 | Deng | | F24B 1/189 110/297 |
| 2013/0312731 A1* | 11/2013 | Zehr | | F24C 15/006 126/15 A |
| 2014/0150672 A1* | 6/2014 | Gurlek | | F24C 15/325 99/325 |
| 2014/0229022 A1* | 8/2014 | Deivasigamani | | G05D 23/1904 700/282 |
| 2014/0260392 A1* | 9/2014 | Hawkins | | F25B 5/04 62/238.6 |
| 2014/0319119 A1* | 10/2014 | Raghavan | | F24C 15/327 219/396 |

FOREIGN PATENT DOCUMENTS

| | | |
|---|---|---|
| DE | 10328069 A1 | 5/2005 |
| EP | 0833108 A1 | 4/1998 |
| EP | 2466211 A1 | 6/2012 |
| GB | 2258126 A | 1/1993 |
| KR | 101110182 B1 | 2/2012 |

* cited by examiner

METHOD FOR OPERATING A COMMERCIAL COOKING DEVICE AND SUCH A COOKING DEVICE

BACKGROUND

1. Field of the Disclosure

The disclosure relates to a method for operating a cooking device, a commercial cooking device, and the cooking device itself.

A cooking device of this kind can be a so-called combi steamer, a baking oven, or also a microwave oven.

2. Discussion of the Background Art

Known cooking devices usually have at least one electrical, electronic, and/or electromechanical component, but, as a rule, they have a plurality of electrical, electronic, and/or electromechanical components. Said electrical components can be circuit boards, electrical relays and switches, sensors, pumps, or also other components, depending on the particular type of cooking device. Conventionally, electrical components of this kind are arranged in a separate region or space of the cooking device at a distance from other components, which are primarily mechanical components, such as, for example, fluid pipes and hoses, ventilator fan wheels, ventilator fan wheel motors, and fluid reservoirs, so that the electrical components are protected against leakages or malfunctions of mechanical components that could damage the electrical components or could lead to short circuits, electrical malfunctions, or fire.

In known cooking devices, there is, as a rule, a single main cooling fan, which is either constantly in operation or can be switched on and off in order to run intermittently when certain temperatures are reached, which, for example, can be measured on a control circuit board or inside the region or mounting space of the electrical components. Usually, the main cooling fan is located in the vicinity of critical components, such as, for example, a circuit board and/or a user interface, in order to optimally cool said component and protect it against failure, which would cause a total breakdown of the device.

Through the activation of the main cooling fan, cool air moves from the region outside the cooking device through the inner first area of the cooking device, while in contrast, it moves only partially through the mounting space for the electrical and mechanical components owing to the construction of the inner region of the cooking device that is aimed at screening off critical components from other components. The moving cooling air heats up markedly from the time of its entry up to the outlet, thereby resulting in a decrease in the cooling effect. Therefore, in known cooking devices, the activation of the main cooling fan for cooling the region or mounting space of the electrical components is often inefficient and ineffective. For example, when the main cooling fan is activated, it is usually necessary, owing to the way the air moves through the inner region of the cooking device, to convey more cooling air than is actually needed to cool all electrical components and the mounting space for the electrical components. In addition, the main cooling fan power needs to be designed in such a way that all components inside the component region or the mounting space can be cooled adequately, regardless of their activation and arrangement. As a result, in the vicinity of the entry point for cooling air, the air circulates optimally around the components and the cooling thereof is greater than what is needed, wherein, in addition, the cooking space is also cooled, which is undesirable.

Furthermore, in known cooking devices, it can come about that the main cooling fan cools components that are not even activated. However, non-activated components do not generate any heat of their own that would require compensation and, moreover, when there is no activation of said components, a high external temperature is not critical for a non-activated component of this kind. Overall, the result of this is a large energy consumption, above all because the heat loss in the cooking compartment needs to be compensated for by activation of a heating device.

Beyond this, the electrical components or the mounting space for the electrical components is/are inefficiently cooled, because the activation of the main cooling fan is brought about indirectly through the temperature increase based on thermal conduction due to the specific temperature inside of the cooking chamber. Moreover, the mounting space for the electrical components is cooled inefficiently, because the number of sensors that induce the activation of the main cooling fan is frequently limited to one sensor and/or the sensor or sensors is/are not optimally arranged for a precise temperature detection.

The object of the present disclosure is therefore to create a method for cooling a cooking device, a commercial cooking device, with which it is possible in a cost-effective way to achieve an efficient cooling of components to be cooled, in particular, of electrical components to be cooled.

SUMMARY

In accordance with the disclosure, it is possible for the cooking device to have only a main cooling fan or else a main cooling fan and at least one auxiliary cooling fan.

In the case of a cooking device that has only a main cooling fan, temperature limits, which are assigned to the operating modes available in the particular cooking device, are initially established and set in the cooking device, and when said temperature limits are exceeded, a cooling is initiated.

For the embodiment of a cooking device that has only a main cooling fan, the cooling itself occurs in that a part of the air aspirated by the main cooling fan is conducted directly into the space in which components to be cooled, in particular, electrical components to be cooled are arranged. Said space is a space that is not directly acted upon by the main cooling fan, unless it is determined that a cooling of the components arranged in this space is required. In this case, the branching off of a part of the aspirated air flow can occur by pivoting an air deflecting flap into the aspirated air flow, said air deflecting flap then conducting a certain part of the total air flow directly into the space with the components to be cooled.

For the embodiment of the method according to the disclosure in which a cooking device that also has an auxiliary cooling fan in addition to the main cooling fan is operated, it is possible to operate either the main cooling fan or only the auxiliary cooling fan or both fans at the same time at the same or at different speeds, depending on which operating mode is determined and depending on the temperature relationships in the cooking device.

A burner, in particular a gas burner, is used as a heating device. A burner of this kind aspirates a considerable amount of fresh air, which is conducted all the way through the housing of the cooking device. The advantageous enhancement in accordance with the above makes use of this circumstance, because the main cooling fan is not activated or can be switched off if it is determined that a second temperature limit is not exceeded and the burner is activated, because the quantity of fresh air aspirated by the burner can then be employed for cooling purposes. Namely, when it is determined that a second temperature limit has not been exceeded, this means that the burner has aspirated an adequately large quantity of fresh air, so that the cooling is so great that the second temperature limit is not exceeded and, accordingly, the main cooling fan does not need to be activated or does not need to be fully activated.

Another object of the present disclosure is to create a cooking device, in particular, in the form of a commercial cooking device, which can be cooled in a cost-effective and technically efficient way, in particular, in terms of its electrical components.

BRIEF DESCRIPTION OF THE DRAWINGS

Further details, features, and advantages of the disclosure ensue from the following description of exemplary embodiments on the basis of the drawing. Shown therein are.

DETAILED DESCRIPTION OF THE PREFERRED EMBODIMENT

Figure 1:
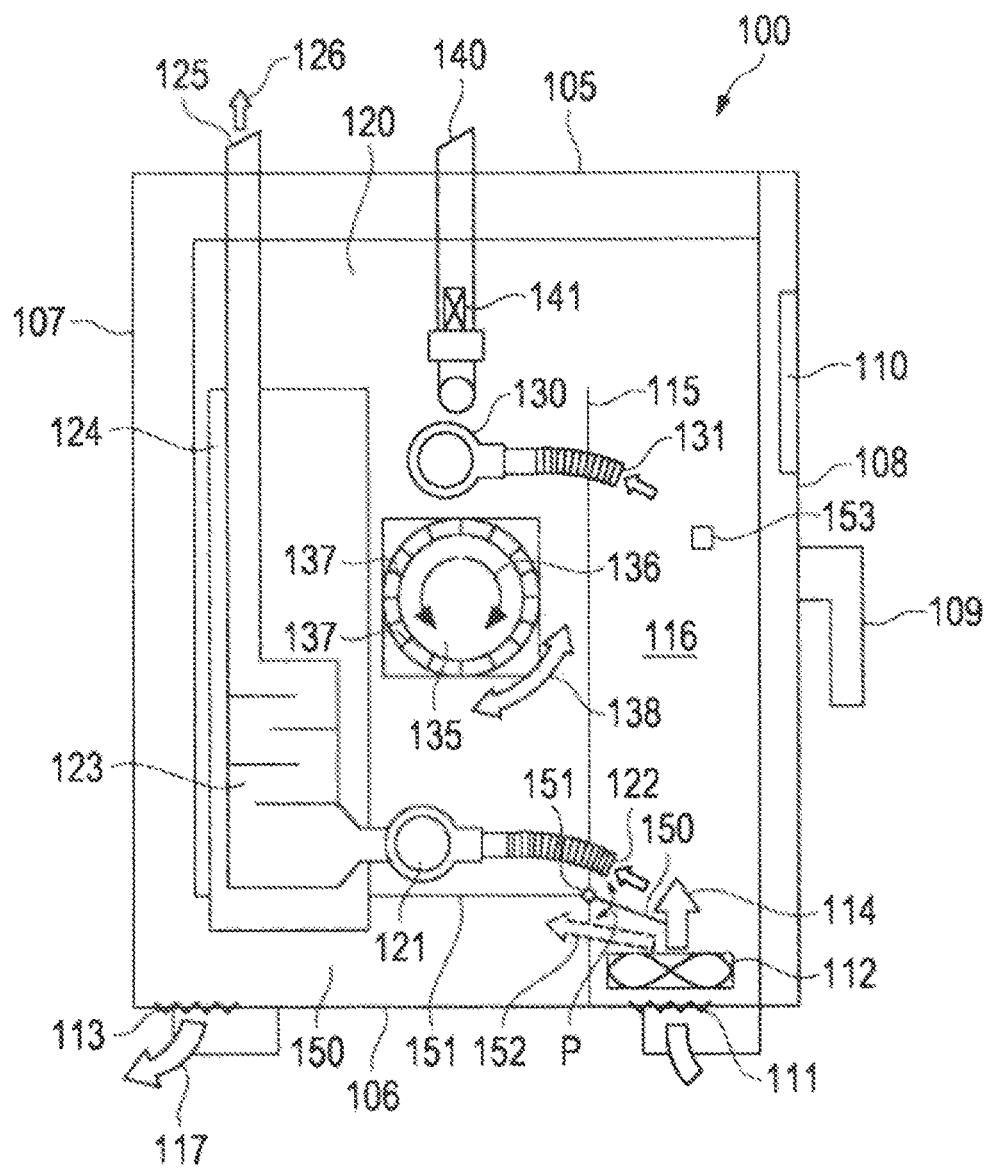
FIG. 1 a schematically highly simplified illustration of a first embodiment of a cooking advice according to the disclosure, FIG. 2 an illustration, corresponding to FIG. 1, of a second embodiment, FIG. 3 an illustration, corresponding to FIGS. 1 and 2, of a third embodiment, FIG. 4 a partially cut-away front view of the embodiment of the cooking device according to the disclosure in accordance with FIG. 3, FIG. 5 an illustration, corresponding to FIG. 1, of another embodiment of the cooking device according to the disclosure, and FIG. 6 a flow chart for explanation of an embodiment of the method according to the disclosure.

FIG. 1 shows a highly simplified schematic illustration of a first embodiment of a cooking device 100 according to the disclosure, which can be, in particular, a commercial cooking device. The cooking device 100 has a cover wall 105, a bottom wall 106, a back wall 107, and a front wall 108. The front wall 108 has a door, which is not illustrated in FIG. 1 and comprises a handle 109 for opening and closing a cooking space, which is also not shown in FIG. 1. The front wall 108 usually has a user interface 110, which comprises a number of functions that can be selected, such as, for example, a display device (display), which displays, for example, information about the cooking product, the cooking conditions (such as, for example, the temperature) in the cooking space, and remaining cooking times of a cooking program that is in operation. The cover wall 105, the bottom wall 106, the back wall 107, and the front wall 108 form a housing and surround a mechanical region or space 120 in which or at which various components having different functions as well as measurement components and display components, such as the aforementioned user interface 110 of the cooking device 100, are arranged. Arranged in the bottom wall 106 is an air inlet opening 111, next to which a main cooling fan 112 is provided, which, in the first embodiment of the cooking device 100 according to the disclosure illustrated in FIG. 1, is the sole cooling fan. Additionally arranged in the bottom wall 106 is an air outlet opening 113.

During operation, the main cooling fan 112 aspirates fresh air through the inlet 111 in order to generate an air flow that flows in the direction of the arrow 114. A separating wall 115 is provided in order to form a channel 116 in the mechanical region or space 120, so that the air flow 114 is conducted upwards in the direction of the cover wall 105 of the cooking device 100. The separating wall 115 therefore conducts the air flow 114 through nearly the entire mechanical region 120, so that the air flow 114 does not flow directly from the inlet 111 to the outlet 113 and exits from the latter, as is symbolized by the arrow 117.

Also arranged in the mechanical region 120 is a heating device, which, in the exemplary case illustrated, is a gas burner 121 with a hose 122, the end of which extends through the separating wall 115 into the channel 116 and is arranged here next to the in inlet 111 and the main cooling fan 112, as is inferred from FIG. 1. During operation, the gas burner 121 aspirates air via its hose 122, heats the air, and conducts the warmed or heated air over metal baffle plates or metal guide plates 123. The metal plates 123 form a flow path for the heated air of the gas burner 121 in order to heat water in the water reservoir 124, so as to deliver steam for the cooking space when running cooking programs that require steam for all or at least a portion of cooking cycles. After passing through the flow path formed by the plates 123, the air heated by the gas burner 121 exits from the cooking device 100 through an outlet 125 in the direction of the arrow 126. Therefore, during operation, the gas burner 121 generates a certain air flow through the inlet 111, through the channel 116, and into the mechanical region 120. The mechanical region 120 also has a cooking-space gas burner 130, which comprises a hose 131, one end of which projects through the separating wall 115 into the channel 116. However, this is only one possible embodiment of the cooking device 100. Namely, the end of the hose 122 could also be directed upwards toward the top edge of the separating wall 115.

Alternatively, the end of the hose 122 could be arranged near a critical and sensitive component, which is then cooled by the aspirated air jet that is conducted into the cooking device 100 when the gas burner 121 is switched on. During operation, similarly to the gas burner 121, the cooking-space gas burner 130 can aspirate air via a hose 131 at a site in the channel 116 that is spaced apart from the inlet 111. Therefore, during operation, the cooking-space gas burner 130 can also generate a certain portion of the air flow through the channel 116 and into the mechanical region 120.

Also arranged in the mechanical region 120 is a motor 135, which can be operated both clockwise and counterclockwise, as is symbolized by the double arrow 136. Furthermore, the motor 135 can adopt a standstill mode for a certain interval of time, which depends on the selected cooking program or recipe. The motor 135 turns a fan wheel, which is not illustrated in FIG. 1 is and is arranged in the cooking space and conducts the hot air that is generated by the gas burner 130 through the cooking space in order to cook the cooking product. The motor 135 is furnished with a plurality of motor cooling blades 137, which produce a certain cooling effect for the motor 135. Owing to the fact that the motor can rotate clockwise or counterclockwise, the motor generates an air flow in its vicinity in the mechanical region 120 that flows either clockwise or counterclockwise, as is symbolized by the double arrow 138, with this movement of air depending on the direction of rotation of the motor 135. When the motor 135 rotates counterclockwise, an air flow is generated in a direction that hinders the air flow that is conveyed in the mechanical region 120 from the channel 116. When the motor 135 is not rotating and, accordingly, when there is no movement of air or circulation of heated air in the component region 120, regions with undesirably high temperatures are obtained. In the mechanical region 120, a channel or flue 140 is further provided, which is in fluid connection with the cooking space. The flue 140 has a valve 141, which can be opened and closed so as to enable heated air to flow out of the cooking space into the surroundings or to enable cooler air to be drawn into the cooking space.

As highlighted in FIG. 1, the cooking device 100 also has an additional space or region 150 for electrical components, which is bounded by the lower part of the separating wall 115 and a bottom wall 151 of the cooking space as well as by the bottom wall 106 of the cooking device 100. In this case, the space 150 is in fluid connection with the inlet opening 111 via, for example, the provision of an opening in the lower area of the separating wall 115, which is not illustrated in FIG. 1.

For the case that the electrical components arranged in the space 150 need to be cooled, the cooking device 100 according to the disclosure, in accordance with the embodiment of FIG. 1, is furnished with a flap 150 that can pivot around a pivot point 151, said flap, as shown in FIG. 1, being able to pivot in the air flow 114 generated by the main cooling fan 112 and can thereby divert a partial air flow 152 from the main air flow 114 and conduct it into the space 150, as is symbolized by the dashed arrow 152. The flap 150 can hereby be pivoted in accordance with the double arrow P around the pivot point 151, so that the opening in the wall 115 can be closed by means of the flap 150 if cooling of the electrical components in the space 150 is not needed.

In this way, an efficient cooling of the electrical components in the space 150 is made possible, wherein the movement of the valve 150 can be motor-driven, for example, and is dependent on whether the electrical components provided in the space 150 require a cooling because, for example, they are in operation. As a control variable for this, it is possible to employ a temperature value that can be determined, for example, in the channel 116 by means of a temperature probe 153.

Alternatively, it is also possible to provide separate temperature probes at other positions inside of the cooking device 100, such as, in particular, in the space 150 itself in which the electrical components are arranged.

Figure 2:
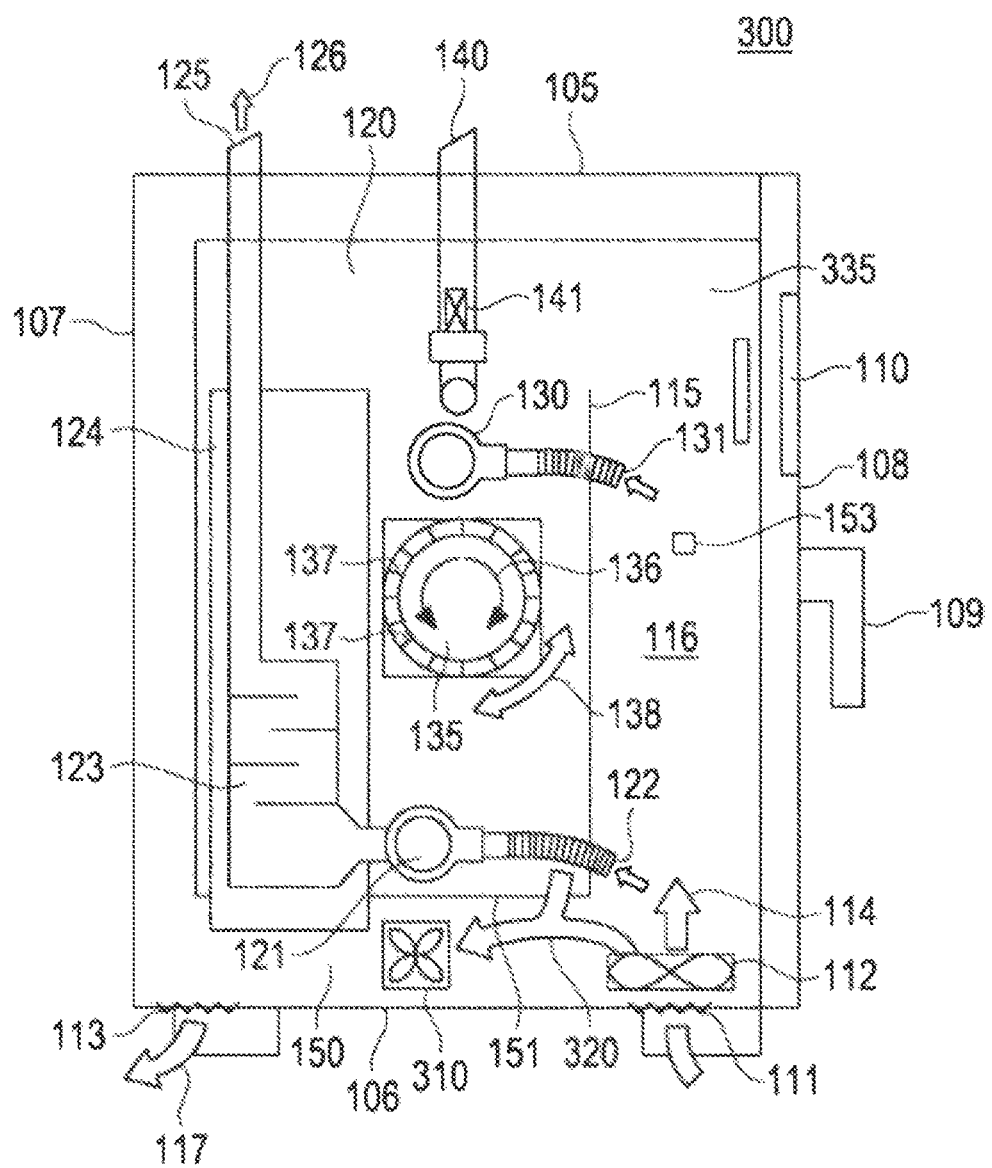

Illustrated in FIG. 2 is a second embodiment of a cooking device 300 according to the disclosure, which can also be designed preferably as a commercial cooking device.

The components that are identical to those in the embodiment according to FIG. 1 are furnished with the same reference numbers, so that reference can be made in this regard to the preceding description of FIG. 1.

In comparison to the embodiment of FIG. 1, the cooking device 300 has an auxiliary cooling fan 310, which can have a lower fan power than the main cooling fan 112, but, if needed, can have the same or even a higher fan power.

The auxiliary cooing fan 310 is arranged and dimensioned in such a way that it can conduct an air flow 320 from the inlet 111, and, if need be, from the mechanical region 120, into the space 150 when it is in operation. As can be seen from FIG. 2, the air flow 320 is aspirated through the inlet 111 on the opposite-lying side of the separating wall 115 from the auxiliary cooling fan 310, whereas, as in FIG. 1, the main cooling fan 112 conducts an air flow 114 into the channel 116. The auxiliary cooling fan 310 is accordingly capable of improving the air flow through the area or space 150 when the main cooling fan 112 generates the air flow 114 during operation. The auxiliary cooling fan 310 makes possible a reduction in the energy consumption caused by the main cooling fan 112 through the following circumstances: (1) The auxiliary cooling fan can be dimensioned smaller and can be designed like the main cooling fan (112); (2) the main cooling fan 112 can remain switched off when the auxiliary cooling fan 310 is switched on; (3) the operating speed of the main cooling fan 112 can be modulated (in particular, reduced) and, in fact, this can be done dependent on the operation of the auxiliary cooling fan 310; and (4) the auxiliary cooling fan 310 is operated only when the components in the space 150 are actuated and therefore require an active cooling. To be highlighted as a further advantage is the circumstance that, through the reduction in the operation of the main cooling fan 112, it can be prevented that the main cooling fan 112 undesirably cools the cooking space of the cooking device.

Figure 3:
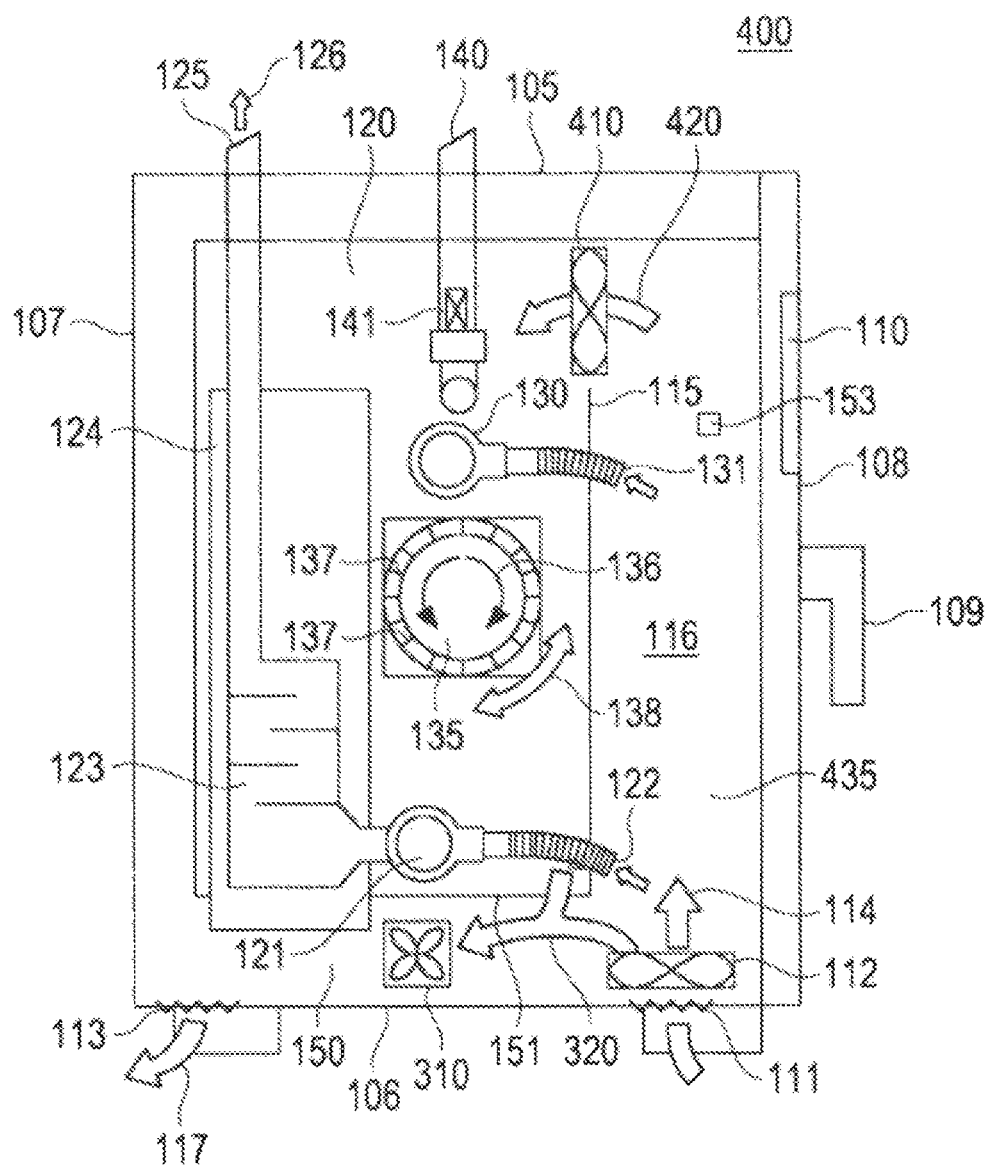

Illustrated in FIG. 3 is another embodiment of a cooking device 400 according to the disclosure, which corresponds essentially to the embodiment in accordance with FIG. 2. In accordance therewith, all components identical to those of the embodiment in accordance with FIG. 2 are furnished with the same reference numbers, so that reference can be made in this regard to the preceding description of FIG. 2 or of the cooking device 300 illustrated therein.

The cooking device 400 has, as an optional feature, an additional fan 410, which is arranged near the upper end of the separating wall 115. However, the fan 410 can be arranged in practically any position, preferably in the channel 116, with respect to the separating wall 115 or also in the mechanical region 120. Preferably, however, the fan 410 is arranged above the separating wall 115 in an intermediate region between the channel 116 and the mechanical region 120. The additional fan 410 is designed and arranged in such a way that it can aspirate an air flow 420 from the inlet 111 and, namely, to do so depending on whether or not the main cooling fan 112 is actuated. At the same time, the fan 410 can improve the air flow through the mechanical region or the mechanical space 120 when the main cooling fan 112 is actuated and the air flow 114 is generated. In addition, the fan 410 make is possible to operate the main cooling fan 112 at a slower speed, which will be explained in detail below on the basis of FIG. 6. Finally, it is to be noted that, as already stated above, the fan 410 represents an optional feature of the cooking device 400 for use, in particular, in high-standing cooking devices that rest on a floor, as illustrated for the cooking device 600 shown in FIG. 5.

Figure 4:
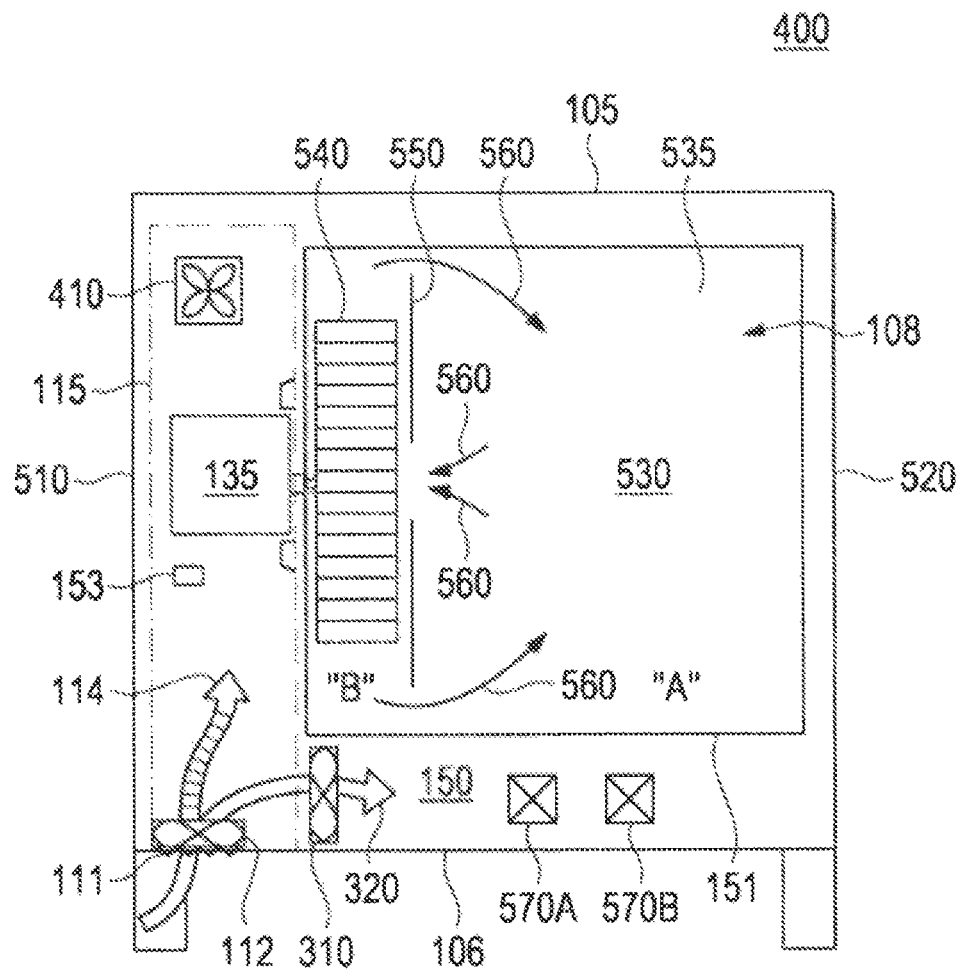

FIG. 4 shows a front view of the cooking device 400 in accordance with FIG. 3. In accordance with the illustration chosen in FIG. 4, the cooking device 400 has a left wall 510 and a right wall 520 (as viewed from the front). The cooking device 400 is additionally furnished with a door 530, which is preferably furnished with a glass pane, so that cooking products in the cooking space 535 can be viewed from the outside. Provided inside the cooking space 535 is a plate or wall 550, which divides the cooking space 535 into two areas "A" and "B." A fan 540 is arranged in the area "B" next to the wall 550. The fan 540 moves heated air through the cooking space 535 and, as mentioned above, is rotated either clockwise or counterclockwise by the motor 135 or else remains at a standstill, so that the motor 135 likewise rotates the fan 540 clockwise or counterclockwise correspondingly. The wall 550 has open spaces in its outer peripheral region as well as a central opening so as to enable air to circulate in the cooking space 535, the direction of which is symbolized in FIG. 4 by the arrow 560. FIG. 4 highlights that, under certain circumstances, the main cooling fan 112 is ineffective for making possible an adequate cooling of the space 150. Therefore, it is advantageously provided in the above-described embodiment for the auxiliary cooling fan 310 to be arranged in the space 150 in such a way that it aspirates fresh air or cooling air through the inlet 111 and conveys it into the space 150, this being symbolized, in turn, by the arrow 320. This makes possible an effective and efficient cooling of electrical components, which are illustrated in FIG. 4 by the blocks 570 A and 570 B. The electrical components 570 A, 570 B in the space 150 can be, for example, cleaning pumps, which are arranged near to and below the cooking space 535. In this way, a hot region is created in the space 150. Because the air flow 114 generated by the main cooling fan 112 is not able to adequately cool the space 150 and the electrical components 570 A and 570 B arranged in it, without operating the main cooling fan 112 at an extremely high fan power, the auxiliary cooling fan 310 is provided. As already mentioned above, an excessively high cooling power of the main cooling fan 112 would have two negative effects: On the one hand, an unnecessarily high electrical load on the main cooling fan 112 would be created and, on the other hand, the cooking space 535 would be cooled undesirably.

Figure 5:
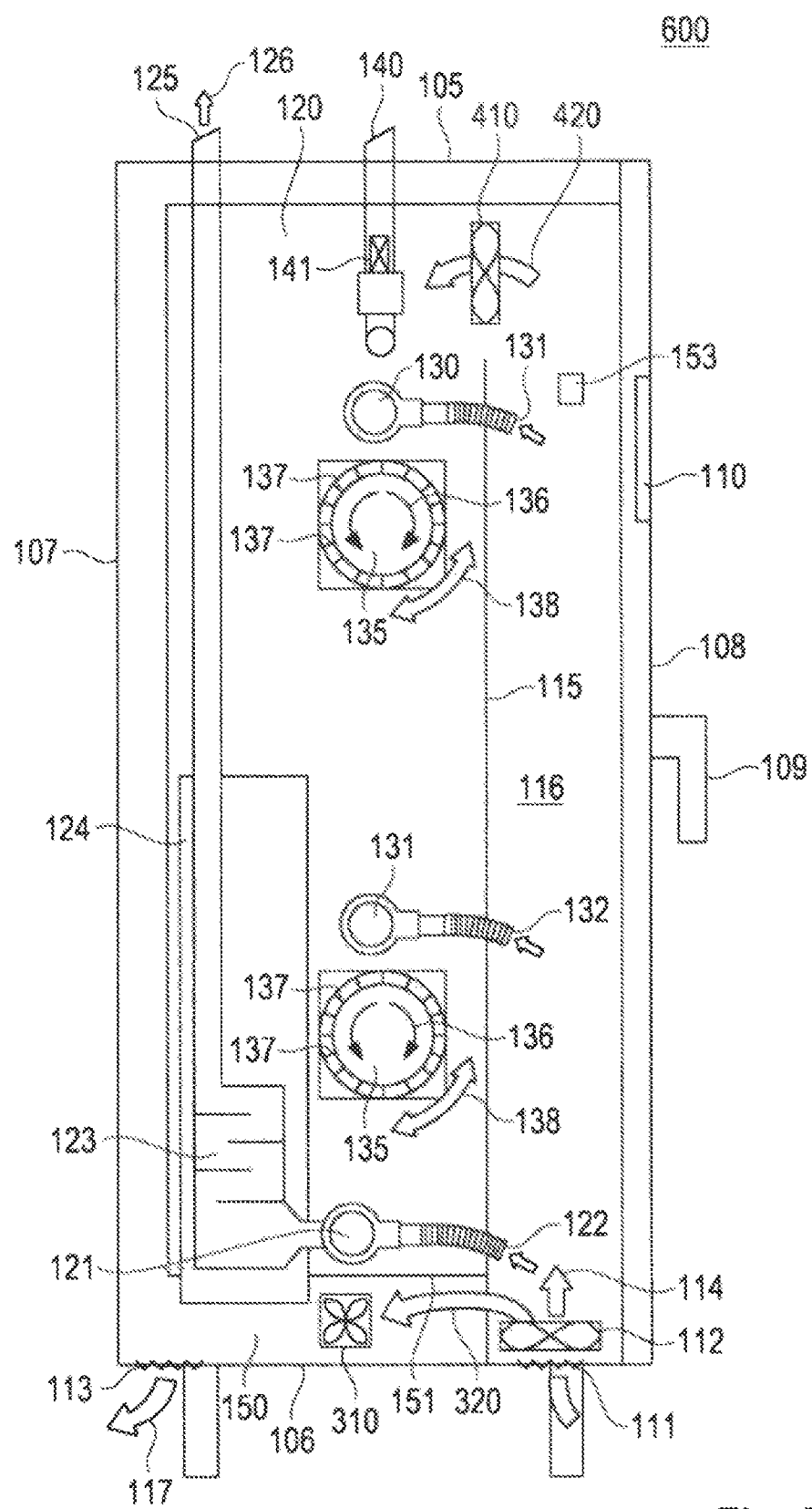

Illustrated in FIG. 5 is another embodiment of a cooking device, which is identified by the reference number 600. All components identical to those in the preceding embodiments are identified with the same reference numbers, so that reference can be made to the preceding descriptions of the embodiments in accordance with FIGS. 1 to 4.

The cooking device 600 illustrated in FIG. 5 is characterized by the provision of two heating devices, which, in the exemplary case, are designed as gas burners 130. Furthermore, the cooking device 600 has motors 135 and the components associated therewith. On account of the height of the cooking device 600 and the length of the separating wall 115 and of the channel 116, an auxiliary fan 410 is an especially preferred embodiment in the case this embodiment, as already mentioned above.

In the following, a possible embodiment of the method according to the disclosure is described on the basis of FIG. 6 and provides a cleaning pump, which is identified in FIG. 4 by the block 570 A and is given solely by way of example, as an electrical component in FIG. 6. Namely, it is also possible to provide additional electrical components in a cooking device, depending primarily on the intended kinds of operation of the particular cooking device.

Figure 6:
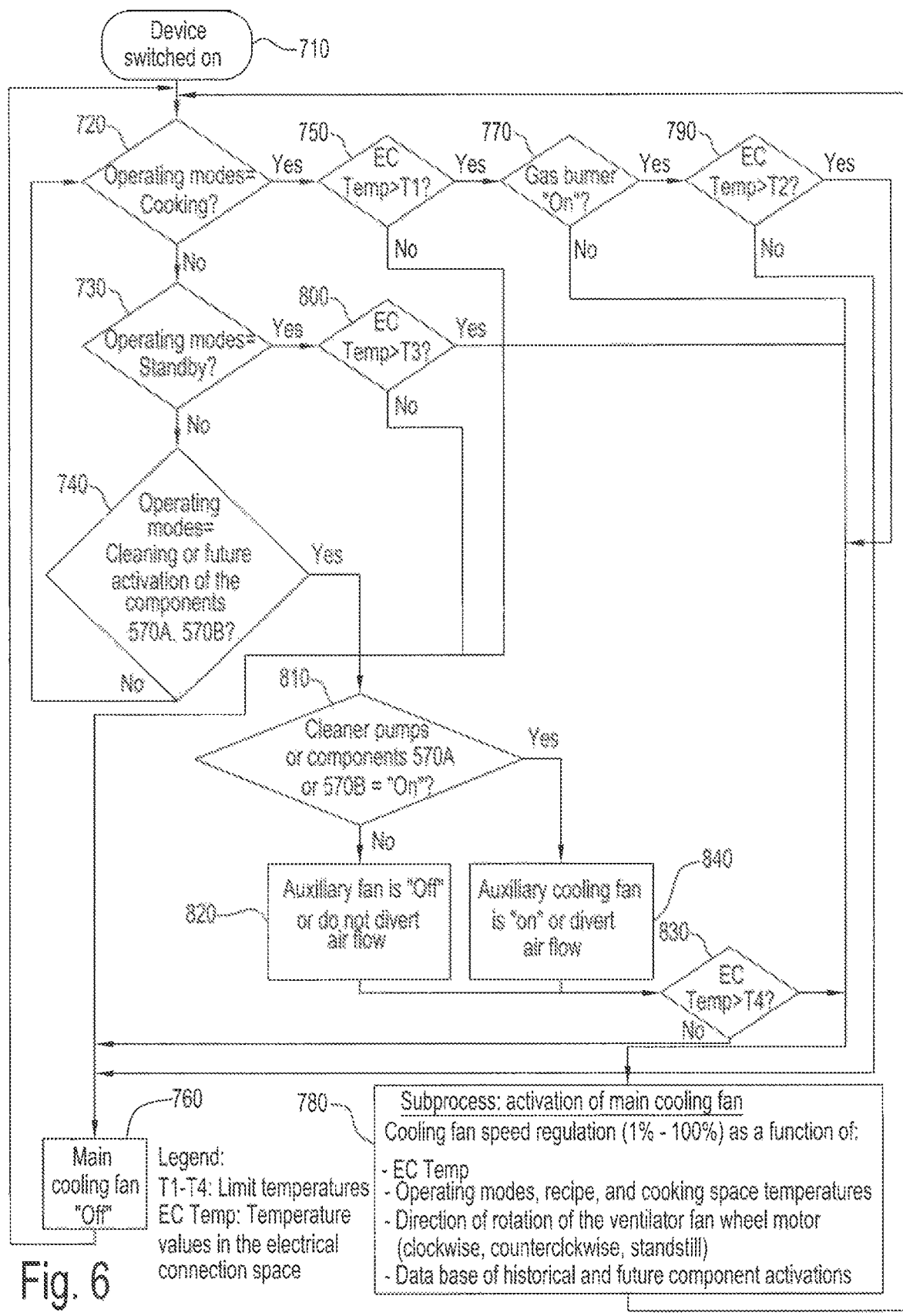

In step 710, the method characterized in FIG. 6 in its totality by the reference number 700 initiates operation of the cooking device, such as devices 100, 300, 400, and 600. In step 720, the operating mode "Cooking mode" is selected. If, in step 720, the answer to the question is "No," then the program or method 700 goes to step 730, which presents another decision block, in which the operating mode "Standby" is queried. It is obvious that said operating mode "Standby" comprises those situations, for example, in which the cooking device has not yet reached the corresponding operating temperature or else those situations in which the cooking devise is being heated up, but is not yet actively cooking a cooking product. If the answer in step 730 is "No," the method 700 goes to step 740, which presents another decision block, in which the question with regard to "Cleaning mode" is posed. If the answer to this question is "No," the method 700 returns to step 720. It is obvious that, in the case of startup of the cooking device, the answer to one of the questions in step 720, 730, or 740 must be "Yes." However, the alternatives "No" were described solely to make it clear that, for these cases, the method 700 moves from one step to the next step and, for the case that all steps 720, 730, and 740 are answered with "No," the method 700 returns to step 720.

For the purpose of the following description of the method 700, it is assumed that no specific temperature has been selected for the temperatures "T1, T2, T3, T4", because the temperatures above all depend on the kind of device and its size as well as on the location where it is used. In addition, the temperature values can be varied by the user or else preset at the factory, wherein the selection of the cooking recipe can be an influencing factor or the temperature values can also depend on the particular installed components that are arranged in the space 150. Solely by way of example, it is stated that the mentioned temperature values can be, for example, T1=45° C., T2=50° C., T3=55° C., and T4=47° C.

If, in step 720, the answer is "Yes," the method 700 proceeds further to step 750. In step 750, a decision block is reached once again, in which it is asked whether the temperature EC in the space 116, 120, or 150 for the electrical components is higher than the temperature limit T1. If the answer is "No," the method 700 proceeds to step 760, in which the main cooling fan 112 is set to "Off" or else remains in this state. If the answer to the question in step 750 is "Yes," then the method 700 goes to step 770. In step 770, another decision block is reached, in which the question is posed as to whether the heating device, in particular the gas burner 130 and/or the gas burner 121, is switched on. If the answer is "No," the method 700 goes to step 780.

According to step 780, the main cooling fan 112 remains in the switched-on state or else is switched to this state. At this point, the speed of the main cooling fan 112 is set as follows: (1) as a function of the actual temperature in the electrical space 116, 120, or 150 or via DIP or fuzzy control technology; (2) as a function of the operating mode and the set operating temperature of the cooking program/cycle of the cooking device; (3) as a function of the motor speed of the motor 135 (clockwise, counterclockwise, or standstill). This is the point in the method 700 at which the auxiliary cooling fan 310 and/or the additional fan 410 can be used. For example, depending on the actual temperature in the space 116, 120, or 150, it is possible to utilize either the auxiliary cooling fan 310 or the auxiliary fan 410 or both fans 310 and 410 in order to increase the flow of air in the space 150 for electrical components. As another example, it is possible to mention the situation in which the motor 135 rotates clockwise and the additional fan 410 is switched on and the speed of the main cooling fan 112 can be lowered (or vice versa);

the air flow 138 that is generated by the motor 135 thus flows in the same direction of rotation as the air flow 114. On the other hand, if the motor 135 rotates counterclockwise, it is possible to utilize either the auxiliary fan 410 and the main cooling fan 112 or else both fans 410 and 112 in order to attain a higher speed, so as to ensure that the air flow 114 can overcome the counterflow of the air flow 138 that is generated by the motor 135.

If, in step 770, the answer is "Yes," then the method 700 goes to step 790. In step 790, which presents another decision block and in which the question is posed as to whether the temperature EC in the electrical space 116, 120, or 150 is higher than T2, the method 700 goes to step 760 if the answer is "No" and the main cooling fan 112 is switched off or remains in the "Off" position.

On the other hand, if the answer to the question as to the temperature in the space 116, 120, or 150 in regard to the temperature T2 is "Yes," then the method 700 proceeds to step 780. For completeness, it is noted that the method 700 analyzes and determines preferably a temperature range—for example, the temperature range between T1 and T2—for the "On/Off" operating state of the burner 130. Above all, this is carried out here, since it primarily involves a safety feature. Namely, investigations carried out in the scope of the disclosure have revealed that the activation of the burner 130 supports the main cooling fan 112 and can even replace it. However, the temperature in the space 116, 120, or 150 can still lie above the temperature T2 and therefore the activation of the main cooling fan 112 is necessary or will be required. This is due to the fact that the gas burner 130 and/or the gas burner 121 work(s) in stages. First of all, the gas burner 130 is started in a minimal performance mode in order to achieve a clean ignition, after which the gas burner 130 is switched to a maximum performance mode. The gas burner 130 in the cooking space accordingly aspirates different quantities of air, depending on whether it is operated in the minimum mode or in the maximum mode, and therefore, correspondingly influences the cooling management.

In step 730, which is likewise a decision block, the question as to the standby mode is asked. If the answer to the question is "Yes," then the program proceeds to step 800, which is likewise a decision block, in which the question is posed as to whether the temperature EC in the space 116, 120, or 150 is higher than the temperature T3. If the answer is "No," the program 700 proceeds to step 760. If the answer to the question at the decision point in step 800 is "Yes," then the program 700 proceeds to step 780. In step 740, a decision block is reached in which the question is posed as to whether the cooking device is found in cleaning mode. If the answer to this question is "Yes," the program 700 proceeds to step 810, which is likewise a decision point or decision block and in which the question is posed as to whether the pump is switched on. If the answer to this question is "No," then the program 700 proceeds to step 820. In step 820, the auxiliary cooling fan 310 in the space 150 is switched off or remains in the "Off" switching state. From 820, the program 700 proceeds to step 830. In step 830, in turn, a decision point or decision block is reached and the question is posed as to whether the temperature EC in the space 116, 120, or 150 is higher than the temperature limit T4. If the answer to this question is "No," the program 700 goes to step 760. However, when the program goes to step 830 and the answer to the question as to whether the temperature EC is higher than the temperature limit T4 is "Yes," then the program 700 proceeds to step 780. If the answer in step 810 is "Yes," that is, if the cleaning pump is switched on, the program 700 switches to step 840, and the fan 310 is switched on or remains in the "On" switching state. When advancing from step 840 to step 830, the question is posed as to whether the temperature EC in the space 116, 120, or 150 is higher than the temperature T4. For the case that the answer to this question is "No," the program 700 proceeds to step 760, whereas, for the case that the answer is "Yes", it proceeds to step 780, in which the main cooling fan is switched on or remains in the "On" switching state.

In addition to the preceding written disclosure of the disclosure, reference is made herewith explicitly to the illustration in FIGS. 1 to 6 for supplementing the disclosure.

What is claimed is:

1. A method for operating a commercial cooking device having at least one heating device, an air inlet opening to the outside of the cooking device having a main cooling fan next to the air inlet, at least one component that requires cooling in a first space that is directly acted upon by the main cooling fan, and at least one additional component that requires cooling in a second space connected to the first space that is not directly acted upon by the main cooling fan, wherein the cooking device operates with different operating modes, and a pivoting flap between the first space and the second space, wherein the method comprises the following steps:
    activating an operating mode of the cooking device;
    establishing and setting, or calculating, at least one temperature limit assigned to the activated operating mode, wherein when said at least one temperature limit is exceeded, cooling is initiated;
    determining, or calculating, whether said at least one temperature limit has been exceeded; and
    activating the main cooling fan to provide an air flow from the air inlet to said first space when said at least one temperature limit is exceeded, wherein a portion of the air flow is diverted directly into the second space using the pivoting flap to cool the at least one additional component that requires cooling in the second space.

2. The method according to claim 1, further comprising the following steps when a cooking mode is the activated operating mode and the at least one heating device comprises a gas burner:
    determining whether a first of the at least one temperature limit is exceeded;
    switching off or not activating the main cooling fan if the first of the at least one temperature limit is not exceeded;
    determining whether the gas burner is activated if the first of the at least one temperature limit is exceeded;
    activating the main cooling fan if the gas burner is not activated;
    determining whether a second of the at least one temperature limit is exceeded;
    switching off or not activating the main cooling fan if the second of the at least one temperature limit is not exceeded; and
    activating the main cooling fan if the second of the at least one temperature limit is exceeded.

3. The method according to claim 1, further comprising determining that the activated operating mode comprises a stand-by mode.

4. The method according to claim 1, further comprising switching on a ventilator fan for supplying cooling air to a space of the cooking device containing a mechanical component.

5. The method according to claim 1, wherein the speed of the main cooling fan is regulated based on criteria selected from the group consisting of a temperature in the second space, an actuating mode of the activated operating mode, a set temperature of the activated operating mode, a direction of rotation of a motor for a ventilator fan, and any combinations of the foregoing.

6. The method according to claim 1, further comprising regulating the speed of the main cooling fan based upon the number of components that require cooling.

7. A method for operating a commercial cooking device having at least one heating device, an air inlet opening to the outside of the cooking device having a main cooling fan next to the air inlet, at least one component that requires cooling in a first space that is directly acted upon by the main cooling fan, and at least one additional component that requires cooling in a second space connected to the first space that is not directly acted upon by the main cooling fan, at least one auxiliary cooling fan disposed in the second space, wherein the cooking device operates with different operating modes, wherein the method comprises the following steps:
  activating an operating mode of the cooking device;
  establishing and setting, or calculating, at least one temperature limit assigned to the activated operating mode, wherein when said at least one temperature limit is exceeded, cooling is initiated;
  determining, or calculating, whether said at least one temperature limit has been exceeded;
  activating the main cooling fan to provide an air flow to said first space when said at least one temperature limit is exceeded;
  activating the at least one auxiliary cooling fan disposed in the second space to provide an air flow to said second space when it is determined that the at least one additional component in the second space requires cooling, wherein the at least one auxiliary fan is disposed in a position spaced apart from the air inlet; and
  conducting airflow from the inlet to the second space using the auxiliary fan to cool the at least one additional component that requires cooling in the second space.

8. The method according to claim 7, further comprising the following steps when a cooking mode is the activated operating mode, and the at least one heating device comprises a gas burner:
  determining whether a first of the at least one temperature limit is exceeded;
  switching off or not activating the main cooling fan if the first of the at least one temperature limit is not exceeded;
  determining whether the gas burner is activated if the first of the at least one temperature limit is exceeded;
  activating the main cooling fan if the gas burner is not activated;
  determining whether a second of the at least one temperature limit is exceeded;
  switching off or not activating the main cooling fan if the second of the at least one temperature limit is not exceeded; and
  activating the main cooling fan if the second of the at least one temperature limit is exceeded.

9. The method according to claim 7, further comprising determining that the activated operating mode comprises a stand-by mode.

10. The method according to claim 7, further comprising switching on a ventilator fan for supplying cooling air to a space of the cooking device containing a mechanical component.

11. The method according to claim 7, wherein the speed of the main cooling fan is regulated based on criteria selected from the group consisting of a temperature in the second space, an actuating mode of the activated operating mode, a set temperature of the activated operating mode, a direction of rotation of a motor for a ventilator fan, and any combinations of the foregoing.

12. The method according to claim 7, further comprising regulating the speed of the main cooling fan or of the auxiliary cooling fan based upon the number of components that require cooling.

13. The method according to claim 7, wherein only the auxiliary cooling fan is activated when it is determined that at least one component in the second space requires cooling but, the at least one in said activated operating mode has not been exceeded.

* * * * *